July 10, 1951 E. E. MASTERSON 2,560,358

MAGNETIC PHONOGRAPH PICKUP

Filed July 31, 1948

INVENTOR
EARL E. MASTERSON
BY Morris Rabin
ATTORNEY

Patented July 10, 1951 2,560,358

UNITED STATES PATENT OFFICE 2,560,358

MAGNETIC PHONOGRAPH PICKUP

Earl E. Masterson, Palmyra, N. J., assignor to Radio Corporation of America, a corporation of Delaware Application July 31, 1948, Serial No. 41,745

11 Claims. (Cl. 179—100.41)

Figures 1, 2, 3, 4, 5, 6, 7, 8:
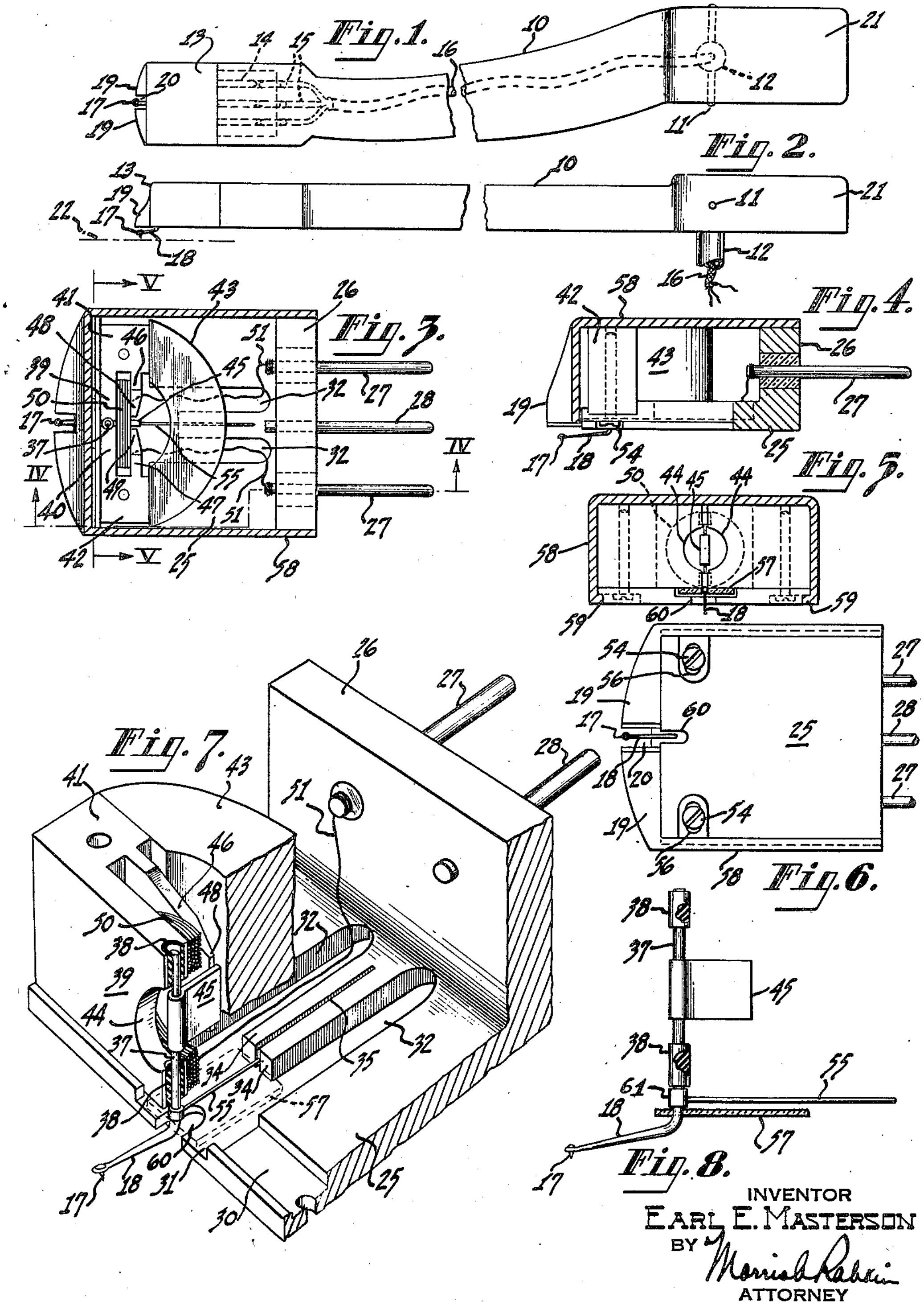

The present invention relates to phonograph pickup devices and like apparatus for translating sound recordings into and from corresponding undulatory electric currents.

Such translating apparatus may be provided in various forms for generating, controlling, or operating in response to sound-representing electrical current variations, and including in any case an electro-mechanical vibratory system having an armature element and a stylus connected therewith for engaging a record groove, and having a certain frequency response characteristic and range, depending upon the stiffness, mass and damping of the vibratory system, and upon the tone arm or other suspension means provided therefor.

It is a primary object of this invention to provide an improved device of the character referred to that embodies minimum stiffness, low mass, light weight and substantially no damping of the vibratory system, whereby an extended frequency range and long record and stylus life may be realized in operation.

It is also an object of the invention, to provide an improved phonograph pickup and suspension means or pickup arm therefor which establishes the mass of the pickup down close to the level of the stylus, and substantially in the horizontal plane of the tone arm, whereby torsional resonance of the suspension means is reduced.

More particularly, the present invention relates to electromagnetic phonograph pickups and the like, and has for its primary object to provide a high-fidelity, light-weight phonograph pickup device of that type.

It is also an object of this invention to provide an improved vibratory system for a signal or sound translating apparatus of the phonograph pickup type, in which mechanical resonance is outside the operating frequency range thereof.

In electric signal translating devices of the character referred to, the vibratory system and the suspension means therefor may have one or more natural periods of vibration within the desired audio frequency response range. Various means of limited effectiveness have been provided heretofore for correcting or reducing undesired peaks in the output voltage response resulting from such periods of vibration within the desired frequency range and for extending such range to higher frequencies and higher fidelity. Such means generally provide a constant damping action in connection with the armature and other vibratory elements, resulting in a less flexible or compliant system and a less responsive translating action.

It is, therefore, a further object of the present invention, to provide an improved signal translating device for electric phonograph sound recording and reproducing systems, having an improved and extended frequency response characteristic, in which the above mentioned and certain other disadvantages of known devices of that character are substantially eliminated.

It is a still further object of the present invention, to provide an improved vibratory system for a device of the character referred to that effectively prevents resonant peaks in the operating characteristic thereof within an extended useful frequency response range, without loading or damping the system within that range or otherwise impairing the translating action.

Phonograph pickup devices of the electromagnetic type generally comprise a pivoted armature element associated with an electrical winding or coil and mounted between two magnetic pole pieces normally substantially centrally of the air gap. The device further includes a casing adapted to be carried at one end of a suspension or tone arm which is pivoted at the opposite end or at a point more remote from the pickup device, for movement in horizontal and vertical planes. The armature element may be provided or connected with a stylus means for engaging the groove of a sound record, and the device further includes a magnet, usually of the permanent type, having considerable mass and weight, a suitable cover for the mechanism forming part of the casing, and electrical terminal means for the winding or coil, usually carried by a base plate or frame also forming part of the casing.

Electromagnetic phonograph pickup devices known to the art have several basic faults and disadvantages, some of which include excessive stylus or needle pressure, limited frequency response range, and a high moment of inertia about the suspension point of the tone arm, with the mass of the pickup proper being conentrated directly over the stylus point.

Various expedients in the past have been provided for eliminating the effect of such mass distribution with respect to the suspension, including mounting the stylus at an angle to the record surface. Practically no vertical compliance is provided with such pickup devices, since the entire mass of the moving system is directly above the record groove. Tipping the pickup so that any vertical component will tend to lift the entire pickup is ineffective, since the vertical component is of such high frequency.

Furthermore, the armature element most frequently is mounted to vibrate about a horizontal axis or about an axis which lies in the plane of the tone arm. With this arrangement, the moment of inertia of the pickup device about the tone arm suspension is such that the stylus may fail to follow the record at certain frequencies and subject the record to excessive pressure and wear.

It is, therefore, a further and important object of the invention, to provide an improved electromagnetic pickup device wherein the vibratory system is flexibly mounted and controlled without introducing the above operating disadvantages, while at the same time extending the useful frequency range for greater fidelity of response.

It is also a further object of this invention to provide an improved electromagnetic vibratory system in a signal translating device of the phonograph pickup type for effecting a relatively low stylus pressure, and an improved suspension means therefor which effectively eliminates any resonant peak within the useful audio frequency range and serves to extend the audio frequency response range to frequencies of the order of 15,000 cycles or more. By having a low stylus pressure and resonant peak completely out of the operating frequency range, no additional electrical compensation is required to produce an extremely flat and wide range high fidelity frequency response, and surface noise and transient difficulties are considerably reduced at all frequencies.

In a pickup device in accordance with the invention, the compliance and inertia are such that the device may be operated very satisfactorily with stylus pressures of the order of one third ounce or less. Also the mass of the pickup device is shifted to the rear of the pivot axis of the vibratory system and toward the suspension point of the tone arm, so that the moment of inertia about the suspension point is appreciably reduced. In a preferred arrangement the magnetic circuit component is mounted on its side.

Vertical compliance is provided for the stylus which is carried by a stylus arm having a pivot axis of vibration which is substantially vertical or normal to the plane of the tone arm. Thus, the stylus is positioned to follow a lateral cut record groove with a high degree of fidelity while at the same time it is compliant in a vertical direction.

In addition, the vibratory system is centered between the operating electrodes or pole pieces with a flexible centering means having substantially no inertia and which provides a guy or anchor effect tending to hold the vibratory system firmly against displacement due to the drag of the record on the stylus in operation.

The entire vibratory system is adapted to be manufactured at low cost and may be mounted in the pickup structure as a unitary assembly without the aid of skilled labor, and requires no adjustment or servicing in operation.

Other objects and advantages will appear from the following description of a present preferred embodiment of the invention when considered in connection with the accompanying drawing, and the scope of the invention is pointed out in the appended claims.

In the drawing:

Figures 1 and 2 are top and side views, respectively, and substantially full size, of a phonograph pickup device and tone arm therefor embodying the invention, Figure 3 is a top view, partly in section and on a greatly enlarged scale, of the pickup device of Figures 1 and 2 showing the interior construction thereof, Figures 4 and 5 are views in elevation and partly in section, on the same scale as Figure 3, of the pickup device embodying the invention, taken on lines IV—IV and V—V of Figure 3 to show further details of the interior construction thereof.

Figure 6 is a bottom view of the pickup device of Figures 1, 2 and 3 and on the same scale as Figure 3, Figure 7 is a greatly enlarged view in perspective, and partly in cross section, showing a portion of the pickup device of Figures 1, 2 and 3, illustrating certain constructional features thereof in greater detail, and Figure 8 is a view in elevation, and partly in cross section and on the same scale as Figure 7, of the vibratory system of the pickup device, showing further details of the construction thereof.

Referring to Figures 1 and 2, an elongated flat suspension or tone arm 10 is provided for vertical and horizontal pivotal movement about a horizontal axis 11 and a vertical axis provided by a tubular support 12, representing any suitable arrangement for suspending the rear end of the tone arm. The forward end of the tone arm is provided with a detachable pickup device 13 which is adapted to be plugged into the end of the arm and which is provided with an internal electrical plug-in connection block 14 and suitable output leads 15 therefor (Figure 1) enclosed in a cable 16 extending through the axis of the tone arm and passing downwardly through the vertical tubular axis 12 at the rear.

It will be noted that the tone arm is of relatively small cross-sectional area and is substantially flat or uniform in thickness in the vertical plane to provide a very light-weight suspension for the pickup device at the free end thereof. Any suitable tone arm of this type may be provided which is of light-weight relatively thin material and a horizontal plane through the center of the pickup device passes substantially through the tone arm axis and the horizontal pivotal axis 11.

The pickup device is provided with a suitable sapphire or other long life stylus 17 extending forwardly from the lower face of the pickup case and carried on a forwardly projecting stylus arm 18 of relatively light weight and small cross section as will hereinafter be described.

The forward face of the pickup device is also provided with a forwardly projecting protective flange adjacent to the stylus and the stylus arm. The flange is slotted to provide two ears 19 with a channel or slot 20 therebetween providing a gap into which the stylus and stylus arm may be pressed in response to accidental dropping of the pickup on a record surface.

The rear end of the tone arm may be provided with a suitable counter weight extension 21 rearwardly of the horizontal axis 11 with respect to the pickup device, whereby the pickup device is suitably balanced for applying to a record surface, indicated at 22, a minimum stylus pressure, thus insuring longer record life while at the same time improving the fidelity of response as will hereinafter be pointed out.

Referring now to Figures 3–8 inclusive along with Figure 1, in which like reference characters are applied to like parts throughout, the pickup device per se, comprises a grooved base or floor plate 25 of suitable material such as light-weight metal or plastic having an integral vertical rear wall 26 in which are mounted two insulated, rearwardly projecting, connection terminal pins 27 and a central grounded terminal pin 28 connected with the wall.

At the forward edge of the floor plate, a transverse slot 30 is provided which is bisected by a central longitudinal groove 31 extending centrally rearwardly of the floor plate substantially to the rear wall 26 and being divided into two spaced narrow slots 32 in extension thereof on either side of a narrow forwardly extending area or land which may be integral with the floor plate and is divided or longitudinally split in a vertical plane to provide two forwardly extending fingers 34 on either side of a narrow slot or cut 35. The cut 35 is exactly central of the pickup device and lies substantially directly in line or in rear of the pickup stylus 17 and stylus arm 18 in a common vertical plane therewith. Thus the stylus arm extends forwardly from the pickup device in the same vertical central plane as the slot 35 in rear thereof.

The stylus and stylus arm are arranged to vibrate in a horizontal plane, that is, parallel to a record surface, about a vertical pivot axis which is normal to the plane of a record surface, provided by a cylindrical elongated pivot shaft 37 preferably formed integral with the stylus arm 18, the latter being flattened and tapered in a vertical plane toward the stylus end of the arm to provide lateral stiffness and vertical compliance for the arm. The stylus arm extends substantially at a right angle to the axis of the pivot shaft, as shown.

The pivot shaft and integral stylus may be formed from a wire of relatively small diameter, preferably of phosphor bronze or other suitable non-magnetic material, and is journaled in spaced bearings provided by suitable resilient sleeves 38 preferably of gum rubber or like material, mounted on the shaft and clamped with it between the magnet pole piece extensions 39 and 40 which are formed integral with pole pieces 41 and 42 of a permanent magnet 43 which bridges the pole pieces rearwardly thereof. The pole piece extensions 39 and 40 are recessed as indicated at 44, between the pivot shaft bearings to provide space for the armature element 45 to be mounted on the shaft between the bearings. The armature extends from the shaft rearwardly to a position between two operation pole piece extensions 46 and 47, which are parallel and in spaced relation to the pole piece extensions 39 and 40, and terminate in narrow pole tips 48 and 49 which are spaced to provide a narrow air gap on either side of the movable end of the armature element 45.

The space between the pole piece extensions 39—40 and 46—47 is occupied by a pickup coil or winding 50 having connection leads 51 connected with the terminals 27 in the frame as shown more clearly in Figure 3. The leads are extended between the coil and the terminals through the slots 32, which serves to maintain them in a fixed position with respect to the remainder of the pickup elements.

The pole pieces are secured to the base plate or frame 25 by suitable bolts or screws 54 as shown more clearly in Figures 4 and 6. These are arranged to move in transverse slots 56 in the floor plate to permit the pole pieces to be pressed together sufficiently to clamp the pivot shaft 37 in the journals or bearings 38 when assembling the pickup. The pole pieces 41—42 and pole piece extensions are of steel or other magnetic material and the permanent magnet 43 is a bar of nickel alloy having a high degree of permeability and is held in place by the magnetic attraction for the pole pieces and rests upon the floor plate or frame 25. The magnet bar is preferably of rectangular cross section and may be straight or curved and slightly convex with respect to the airgap as shown.

With this arrangement, the free end of the armature 45 lies between the pole tips 48—49 and is surrounded by the pickup coil or winding 50. Vibration of the armature in response to lateral movement of the stylus 17 serves to vary the flux flow through the armature by variation in the air gap on either side of the armature, causing a variation in the flux surrounding the coil and thereby generating a voltage in the coil as is well known. The armature is deflected from the central position either by mechanical forces derived from a record groove through the operation of the stylus or by forces derived from electric currents flowing in the coil.

Normally the armature is held in the centered position between the pole pieces, and the stylus is likewise held in a central forward position, by means of a centering spring wire 55, which is secured at one end to a sleeve 61 carried by the lower end of the pivot shaft and clamped at the opposite end between the fingers 34—34 in the slot or cut 35. In mounting and assembling the pickup vibratory system, the wire 55 is dropped into the slot as the bearings are assembled about the pivot shaft and sufficient clamping pressure is applied to the fingers by peening, for example, to lock and hold the wire tightly clamped and secured against movement longitudinally, laterally or vertically thereafter. The centering spring has a short free length which is straight and is caused to flex upon movement of the stylus 17 and operates without inertia to restore the stylus to a normal centered position, together with the armature, upon cessation of an actuating force on the stylus or armature.

An effective dust seal may be applied to the base plate below the centering spring as indicated at 57, shown in dotted lines in Figure 7, and serves to prevent the entry of dust, magnetic particles and other foreign matter into the interior and into the air gap. The dust seal may be composed of thin sheet rubber and may be made to close the opening about the pivot shaft since no appreciable damping results due to the fact that the pivot shaft is of relatively small diameter, and hence, does not move appreciably at that point, which is relatively close to the center of rotation.

The casing of the pickup is completed by a removable cover member 58 which is open at the rear and at the bottom face thereof to slide onto the frame or base 25 in longitudinal grooves along the lower outer edges of the base, which are engaged by inwardly extending lips 59 on the cover. The cover is pressed onto the base rearwardly until it engages the back wall as a stopping means, at which time the protective ears 19 are brought into position to protect the forwardly projecting stylus. The stylus arm extends through the floor plate of the pickup frame in an open faced slot 60 forming an opening, the forward face of which is closed by the removable cover when in place.

It will be noted that the transverse slots 30 provide a receptacle for locating the pole pieces and the pole piece extensions 39 and 40, and provide a space for receiving the pickup winding 50, thereby aiding in the assembly of the pickup device, since the exact location of the pole pieces is determined by the transverse slot 30. Likewise, the position of the vertical pivot axis is determined by the position of the centering spring 55 engaging the central longitudinal slot or cut 35 between the fingers 34—34, and the pole pieces 41 and 42 are merely moved inwardly and clamped by the screws 54, with the pivot shaft 37 located in position by the centering spring 55. Thus the assembly of this miniature pickup device is facilitated without aid of skilled labor.

From the foregoing consideration of the pickup structure and mounting it will be seen that, as shown in Figures 1 and 2, the pickup device per se is extremely miniature in size and, therefore, is of lower mass and provides a relatively light weight on the record surface. The magnetic structure is substantially arranged to lie on its side with the pivot axis of the armature and stylus substantially vertical or normal to the plane of the tone arm when the pickup is mounted in use.

The vertical pivot shaft is rotated by a vertically compliant stylus arm. The stylus arm is relatively stiff laterally and transmits substantially 100 per cent of the stylus motion to the armature or pivot shaft. The vertical flexibility of the stylus arm adds greatly to the record life in that it responds to the "pinch effect" by flexing instead of forcing the record material to yield.

In known forms of pickup devices of the character described, practically no vertical compliance is provided since the entire mass of the moving system is directly above the stylus. Because of the high frequency, (double the record frequency), of the vertical movement of the stylus in operation due to this effect, any vertical component which tends to lift the pickup does not provide for overcoming the normal inertia of the tone arm and pickup system.

The stylus 17 may be provided by a permanent jewel tip of relatively small dimensions as shown inserted in the end of the stylus arm which is perforated to provide a receptacle for the stylus.

Furthermore, in the construction shown a relatively small and thin armature element is provided. It is in the form of a thin leaf or plate of relatively small dimensions both in length and width and lies between pole tips which provide a concentration of the flux through the armature by reason of conforming to the size of the armature. With this arrangement, the fundamental resonance of the vibratory system of the pickup occurs at approximately 17,000 cycles with the construction shown. This is a considerable improvement over known types of pickups which offer resonance in the region of 5,000 cycles per second. By having the resonant peak completely out of the useful audio frequency range, substantially no additional electrical compensation is required to produce a desired flat high fidelity response characteristic and the surface noise and transient voltages are reduced substantially to zero.

By having the resonant peak of the vibratory system of the pickup device above the useful audio frequency range, no damping material is required in connection with the system or at any point in the pickup device.

The compliance and inertia are such that a pickup may be operated with a relatively low stylus pressure substantially a low fraction of an ounce in weight as against much higher pressures now known in the pickup art. The low pressure, low inertia, and vertical compliance reduce the "needle talk" or "chatter" to a point where it is barely audible. This is of great advantage in applications such as studio work where a live microphone is used in the same room with the pickup device.

In one form of the invention, as shown, the coil 50 may be wound with No. 6 enamel wire and has an impedance of approximately 70 ohms. By using the proper compensation it is possible to feed the output directly into a 250 ohm line with an output of the order of —55 vu. This is of a sufficient level to feed directly into a normal microphone amplifier.

Referring particularly to Figure 8, the miniature size of the parts may more fully be appreciated when it is pointed out that the Phosphor bronze wire pivot shaft may have a diameter of .024 inch and a length of .230 inch. The stylus arm may have a thickness of .018 inch and the stylus a diameter of .015 inch. The length of the stylus arm may be of the order of .165 inch and the centering spring may be provided by a short straight length of steel piano or music wire substantially .006 inch in diameter.

The armature element 45 may have a vertical height of .05 inch and a length of .075 inch and may be composed of a thin steel wafer substantially .005 inch thick, preferably of a material known on the commercial market as "Hypernick." This is a suitable nickel-steel alloy. Any suitable magnetic material may, of course, be used for the armature element which is adapted effectively to convey the flux through the operating winding 50 and which provides light weight.

The frame or base 25 and the integral back wall 26 as well as the cover 58 are preferably made of non-magnetic material such as brass, for example. It should be noted that the spaced ears 19 on the forward end of the cover provide both protective means for the stylus and means for directly viewing it in operation, which is an advantage in locating it in a starting groove of a record.

Further considering Figure 8 along with Figure 7, it will be noted that the stylus arm 18 and the centering spring for the stylus arm and armature are substantially in the same vertical plane with the armature and the pivot shaft, and that the centering spring is substantially an extension of the stylus arm so that, in effect, it serves to retain or hold the pivot shaft in position against the drag or operating action on the stylus 17, which is in a forward direction.

Therefore, the centering spring has a guy wire effect upon the pivot shaft 37, as well as a centering action and thus serves to prevent chatter or movement of the lower end of the pivot shaft, since it anchors the pivot shaft in position by direct connection at the junction of the pivot shaft and the stylus arm. This desirable feature thus provides rigid anchoring of the pivot shaft against forward movement in response to operating negative pressure or drag on the stylus. Furthermore, it will be seen that the magnetic structure is substantially horizontal, providing the mass of the permanent magnet 43 and the center of mass of the pickup in a rearward position with respect to the pivot shaft and stylus, and substantially in the plane of the tone arm, so that the moment of inertia about the horizontal pivot axis 11 of the tone arm and tone arm resonance are both greatly reduced. This reduced moment of inertia of the pickup mass has an appreciable effect upon the operation of the stylus in the record groove, and considerably reduces the effective wear on both the stylus and the record.

Furthermore, the pivot shaft of the present structure is vertical so that it forms a true axis of vibration for the laterally moving stylus at the extended forward end of the stylus arm. The stylus arm is at substantially a right angle to the pivot shaft, and in the same vertical plane. Heretofore various compromises have been made in the vibratory systems of known pickup devices which prevented this ideal arrangement of the mounting of the armature and stylus. No damping is required between the armature and any portion of the fixed support provided by the frame. The mass of the pickup is relatively low and down close to the stylus tip, that is, along the axis of the tone arm and in extension thereof, whereby torsional resonance and whip of the pickup arm are reduced.

It should be understood that while the invention is particularly adapted to electromagnetic pickup devices, as is also the vibratory system of the present invention, the invention may be embodied in any signal translating device of the electric pickup type for phonograph record reproduction and the like wherein similar problems are met, and where a minimum stylus pressure and an extended frequency response range are desired without resonant peaks.

I claim as my invention:

1. In a phonograph pickup device, the combination of a casing base, a horizontal magnet structure extending rearwardly of and along the casing base, a vertically compliant stylus arm extending forwardly from and below said base and forwardly of said magnet structure, means providing a vertical pivot axis for said stylus arm in a forward central position with respect to said magnet structure and base, and flexible guy wire centering means connecting said stylus arm and said vertical pivot axis means to said casing base, the center of mass of said pickup being relatively low with respect to said stylus arm and rearwardly of said pivot axis.

2. A phonograph pickup device as defined by claim 1, wherein the vertical pivot axis for the stylus arm is provided by a shaft journaled in spaced bearing means within the magnet structure, and wherein said flexible guy wire centering means for said shaft is attached at one end to the casing and at the opposite end to the shaft adjacent its junction with the stylus arm, said flexible guy wire centering means, said pivot shaft and stylus arm all lying normally in the same vertical plane.

3. In a phonograph pickup device, the combination of a casing, an external stylus element, a forwardly extending stylus arm carrying said stylus externally of said casing, an armature element, a normally vertical pivot shaft for said armature element journaled within said casing and rigidly connected at its lower end with the rear end of said stylus arm, a flexible substantially straight spring wire attached to said pivot shaft adjacent the junction of said shaft and said stylus arm and extending rearwardly within the casing in a plane common to said arm and pivot shaft providing a centering spring for said armature element, and deformable means for attaching the opposite end of said wire to said casing.

4. A phonograph pickup device comprising in combination, a casing, an external stylus element, a forwardly extending stylus arm carrying said stylus externally of said casing, a vertical pivot shaft journaled within said casing and rigidly connected with said stylus arm at the lower end thereof, a vibratory armature carried by said pivot shaft, a flexible spring centering wire having a substantially straight portion attached at one end to said pivot shaft adjacent the junction of said shaft and said stylus arm and extending rearwardly within the casing in a plane common to said arm and pivot shaft, deformable means for attaching the opposite end of said wire to said casing, and a magnetic structure comprising a permanent magnet bar positioned in said casing on one of its sides and having forwardly extending pole pieces, said magnetic structure being disposed substantially to one side of said vertical pivot shaft and stylus arm whereby the center of mass of said pickup device is rearward of said stylus.

5. A phonograph pickup device comprising in combination, a casing, a stylus element, a normally substantially horizontal forwardly extending stylus arm carrying said stylus, a normally vertical pivot shaft journaled within said casing and rigidly connected at its lower end with said stylus arm at the rear end thereof, a flexible spring centering wire attached to said pivot shaft adjacent the junction of said shaft and said stylus arm extending rearwardly therefrom in a plane common to said arm and pivot shaft, means providing a fixed attachment for the opposite end of said wire in said casing, a magnetic structure comprising a permanent magnet bar positioned in said casing on one of its sides and having forwardly extending pole pieces, said magnetic structure being disposed substantially to one side of said vertical pivot shaft and stylus arm whereby the center of mass of said pickup device is rearward of said stylus, said casing comprising a base plate having an integral rear wall extending vertically therefrom, and a cover member movably mounted on said base plate from a frontal position, said cover member having forwardly projecting ears on opposite sides of said stylus arm providing a protective gap into which said stylus arm and stylus are movable upon impact, said gap providing means for viewing said stylus in operation.

6. A phonograph pickup device comprising in combination, a vibratory system having a pivot shaft adapted to be substantially vertical with respect to a record surface in operation, a forwardly extending stylus arm carried by the lower end of said shaft and extending therefrom substantially at a right angle thereto, a centering spring comprising a straight spring wire attached at one end to the lower end of said shaft, and means for engaging and locking the opposite end of the spring wire in a fixed position substantially in rear of said stylus arm, thereby to guy said arm and pivot shaft against record drag on said stylus.

7. A phonograph pickup device as defined by claim 6, wherein a magnet structure is provided in a horizontal position in rear of said pivot shaft, the center of mass of said pickup device being relatively low with respect to said stylus arm and in rear of said pivot shaft to provide a reduced moment of inertia with respect to the suspension of said device in operation.

8. A phonograph pickup device comprising in combination, a casing adapted to be mounted in the end of a tone arm substantially in axial extension thereof, a vibratory system in said casing having a pivot shaft adapted to be substantially vertical with respect to a record surface in operation, a forwardly extending stylus arm carried by the lower end of said shaft and extending therefrom substantially at a right angle thereto, a centering spring comprising a straight spring wire attached at one end to the lower end of said shaft, said spring wire being substantially straight and having a predetermined free flexible length, and means for engaging and locking the opposite end of the spring wire within said casing.

9. A phonograph pickup device comprising in combination, a vibratory system having a pivot shaft adapted to be substantially vertical with respect to a record surface in operation, a forwardly extending vertically compliant stylus arm carried by the lower end of said shaft and extending therefrom substantially at a right angle thereto, a centering spring comprising a straight spring wire attached at one end to the lower end of said shaft, means for engaging and locking the opposite end of the spring wire in a fixed position substantially in rear of said stylus arm, thereby to guy said arm and pivot shaft against record drag on said stylus, a casing for said device comprising a transversely and longitudinally centrally grooved base member having a rear wall integral therewith and a forwardly removable cover slidably engaging said base member and wall, said cover having a pair of forwardly extending spaced ears on either side of the stylus and the forward end of the stylus arm, providing protective and direct viewing means for the stylus in operation, a magnet structure comprising both a magnet element and opposed pole pieces mounted on and in engagement with the base member in rear of the stylus and pivot shaft to effectively locate the center of mass rearwardly and downwardly toward the base member, thereby to reduce the moment of inertia of the device at the stylus and the tendency to resonate about a horizontal axis.

10. A phonograph pickup device comprising in combination, a casing, a vibratory system therein having a pivot shaft adapted to be substantially vertical with respect to a record surface in operation, a forwardly extending vertically compliant stylus arm carried by the lower end of said shaft and extending therefrom substantially at a right angle thereto, a centering spring comprising a straight spring wire attached at one end to the lower end of said shaft, and means for engaging and locking the opposite end of the spring wire in a fixed position substantially in rear of said stylus arm, thereby to guy said arm and pivot shaft against record drag on said stylus, said last named means comprising a pair of deformable forwardly extending fingers formed in the casing and providing a slot therebetween for receiving the rear end of the centering spring.

11. In a phonograph pickup device, the combination of a casing base, a horizontal magnet structure extending along said casing base, a compliant stylus arm extending forwardly from and below said base, means providing a pivot axis for said stylus arm, and flexible guy wire centering means connecting said stylus arm and said pivot axis means to said casing base, the center of mass of said pickup being relatively low with respect to said stylus arm and rearwardly of said pivot axis.

EARL E. MASTERSON.

REFERENCES CITED

The following references are of record in the file of this patent:

UNITED STATES PATENTS

| Number | Name | Date |
|---|---|---|
| 2,027,169 | Harrison | Jan. 7, 1936 |
| 2,212,530 | Weil | Aug. 27, 1940 |
| 2,373,181 | Fleming | Apr. 10, 1945 |
| 2,397,888 | Snepvangers | Apr. 2, 1946 |
| 2,410,607 | Moore | Nov. 5, 1946 |
| 2,417,712 | Snepvangers | Mar. 18, 1947 |
| 2,476,684 | Rieber | July 19, 1949 |